Sept. 29, 1936.   G. C. RAMSPECK   2,056,079
PISTON
Filed April 10, 1934
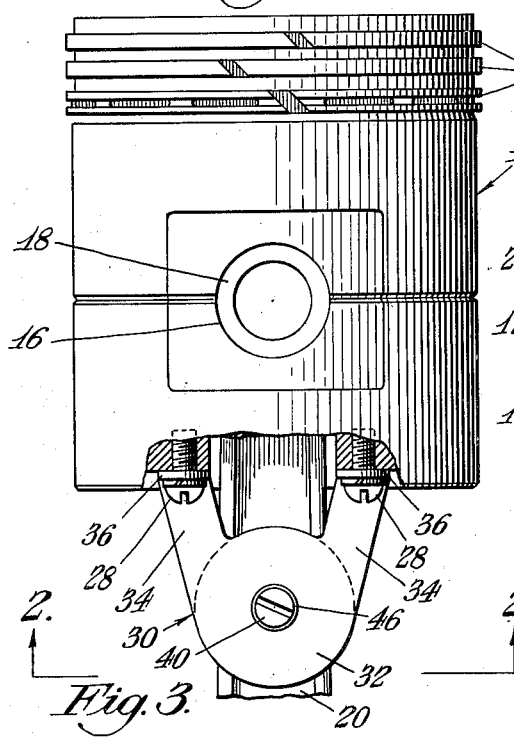
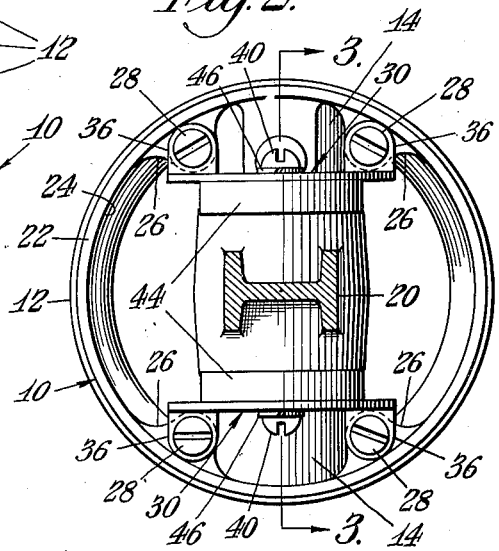
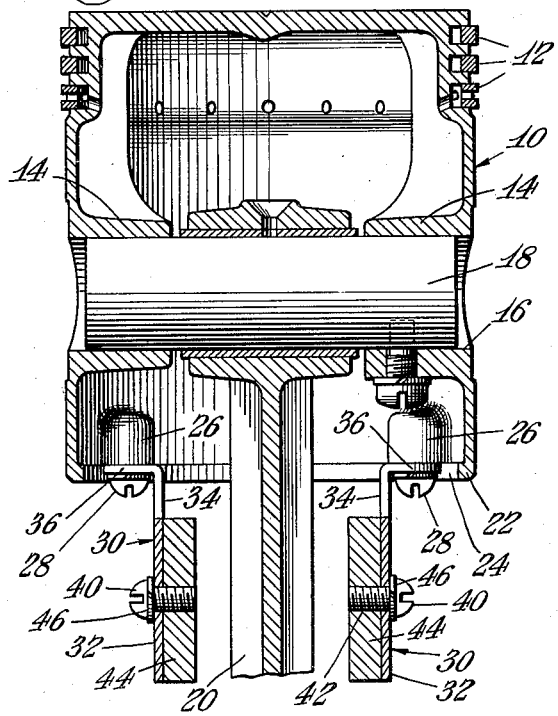
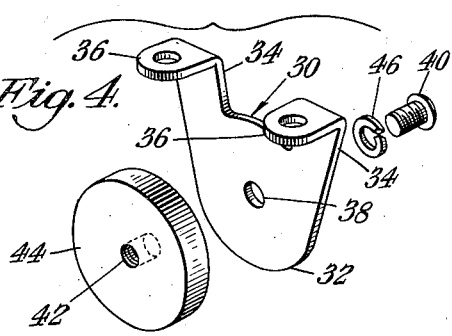
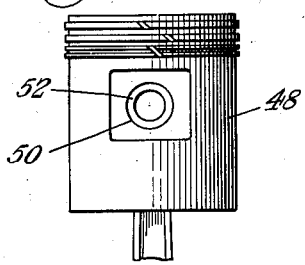
George C. Ramspeck
INVENTOR
BY Victor J. Evans & Co.
HIS ATTORNEYS Patented Sept. 29, 1936

2,056,079

UNITED STATES PATENT OFFICE 2,056,079

PISTON

George C. Ramspeck, Chicago, Ill.

Application April 10, 1934, Serial No. 719,947

11 Claims. (Cl. 309—10)

My invention relates to internal combustion engines; and the objects of my improvement are, first, to provide a piston constructed to eliminate what is commonly known as piston slap; second, to afford facilities for the proper readjustment of conventional pistons; third, to reduce vibration common to engines of this type; and fourth, to attain a better seal between the piston rings and the cylinder wall, with a large reduction in the wear common to cylinder walls.

In the accompanying drawing:

Fig. 1 is a side elevation of a piston embodying my invention;

Fig. 2 is a bottom view;

Fig. 3 is a sectional view along the line 3—3 of Fig. 2;

Fig. 4 is a view illustrating the parts in perspective; and

Fig. 5 is a view of a different form.

In the embodiment selected to illustrate my invention, I make use of a piston 10 equipped with the usual piston rings 12 and having bosses 14 bored at 16 to receive the wrist pin 18 for connection with a connecting rod 20. The lower end of the skirt is provided with a flange 22 milled at 24 for center purposes in the usual way.

I have discovered that a piston having the axis of the wrist pin 18 coinciding with the center of gravity of the piston provides a construction eliminating what is usually called piston slap, in addition to eliminating much of the vibration common to inventions of this type, as well as attaining longer wear of the cylinder wall.

To this end, I provide bosses 26 projecting inwardly from the inner side of the skirt and provided with threaded bores for the reception of bolts or screws 28 arranged to fasten brackets 30 to the bosses. I illustrate each bracket as comprising a curved body portion 32 having legs 34 provided with flanges 36 positioned against the ends of the bosses 26. Referring to Fig. 4, the body portion 32 is provided with an opening 38 for the reception of a screw 40 having threaded relation with the opening 42 in the balancing block 44. The screw 40, as well as the screws 38, is provided with lock washers 46.

Thus, the balancing blocks 44 may be attached to the brackets 36 for loading the lower end of the piston for exact balance with the upper end. The blocks 44 may be made in different sizes, to provide a large range of adjustment for the piston. Precise balance may be attained by removing small amounts of material from the blocks. My invention contemplates a balanced condition of the piston with the rings 12 in place.

Referring to Fig. 3, the bosses 26 terminate in a plane above the flange 24, to permit the flange 22 to be milled without interference from the bosses. In Fig. 5, I illustrate a piston 48 as being originally manufactured with the bores 50 arranged to make the axis of the wrist pin 52 coincide with the center of gravity of the piston, thus eliminating the necessity for the brackets 32 and balancing blocks. Of course, the balancing structure illustrated in Figs. 1 to 4, inclusive, is applicable to pistons of conventional design.

Without further elaboration the foregoing will so fully explain my invention that others may, by applying current knowledge, readily adapt the same for use under various conditions of service.

I claim:

1. In a piston having a wrist pin for connection with a connecting rod, said wrist pin being spaced from the normal center of gravity of the piston, and a weight attached to the lighter end of the piston for shifting the center of gravity to correspond with the longitudinal axis of the wrist pin.

2. In a piston having a wrist pin for connection with a connecting rod, one end of said piston originally having one end heavier than the other with respect to its wrist pin connection, and a weight attached to the lighter end of the piston for balancing the same with respect to the wrist pin connection.

3. In a piston having a wrist pin for connection with a connecting rod, said piston being normally unbalanced with respect to the wrist pin connection, and a pair of balancing elements connected with the lighter end of the piston to balance the same with respect to the wrist pin connection.

4. In a piston having a wrist pin for connection with a connecting rod, said piston being normally unbalanced with respect to the wrist pin connection, and a pair of balancing elements connected with the lighter end of the piston to balance the same with respect to the wrist pin connection, each of said balancing elements comprising a bracket and a removable weight block.

5. In a piston having a wrist pin for connection with a connecting rod, said piston being normally unbalanced with respect to the wrist pin connection, and a balancing element connected with the lighter end of the piston to balance the same with respect to the wrist pin connection, said balancing element comprising a bracket having a removable weight block fastened thereto.

6. In a piston having a skirt provided with a lug on its inner wall, a bracket having a screw opening, a screw passing through said opening and having an end anchored in said lug, to connect the bracket with the piston, and a weight block carried by said bracket.

7. In a piston having a skirt provided with a pair of lugs, a balancing bracket having two legs arranged for connection with said lugs, and means connecting the bracket with said lugs.

8. In a piston having a wrist pin for connection with a connecting rod, one end of said piston being heavier than the other with respect to the wrist pin connection, and a pair of weight elements connected with the lighter end of the piston for balancing the same with respect to the wrist pin, said weight elements lying in a common plane defined by the longitudinal axis of the piston and paralleling the longitudinal axis of the wrist pin.

9. In a piston having a wrist pin for connection with a connecting rod, said wrist pin being arranged with its longitudinal axis corresponding to the center of gravity of the piston with its rings attached.

10. In a piston having a wrist pin for connection with a connecting rod, said wrist pin being arranged with its longitudinal axis corresponding to the center of gravity of the piston.

11. A piston for internal combustion engines comprising a skirt part provided with openings, a wrist pin positioned in said openings, said piston being so balanced with respect to the wrist pin that the center of mass of the piston coincides with the longitudinal axis of the wrist pin.

GEORGE C. RAMSPECK.